United States Patent [19]

Moneghan

[11] 4,102,620
[45] Jul. 25, 1978

[54] APPARATUS FOR MOLDING RIGID STRUCTURES FROM DRY FRICTION MATERIAL

[75] Inventor: Edward Moneghan, Hatboro, Pa.

[73] Assignee: Pennwalt Corporation, Philadelphia, Pa.

[21] Appl. No.: 737,880

[22] Filed: Dec. 27, 1976

Related U.S. Application Data

[62] Division of Ser. No. 637,914, Dec. 5, 1975, Pat. No. 4,003,498, which is a division of Ser. No. 633,054, Nov. 18, 1974.

[51] Int. Cl.² .............................................. B29F 3/06
[52] U.S. Cl. .................................... 425/147; 425/155; 425/327
[58] Field of Search ............... 425/200, 207, 208, 205, 425/209, 204, 147, 145, 395, 296, 297, 327, 325, 155, 179, 166; 141/93; 222/227, 1, 56; 198/659

[56] References Cited

U.S. PATENT DOCUMENTS

| | | | |
|---|---|---|---|
| 2,522,936 | 9/1950 | Ferguson | 425/200 X |
| 2,674,396 | 4/1954 | Peterson | 222/227 X |
| 3,104,425 | 9/1963 | Immel | 425/200 X |
| 3,177,527 | 4/1965 | Nelson | 425/147 |
| 3,225,963 | 12/1965 | Arpajian | 222/56 X |
| 3,661,485 | 5/1972 | Arpajian | 425/297 X |
| 3,726,392 | 4/1973 | Rastoin | 198/659 |

FOREIGN PATENT DOCUMENTS

276,270  11/1969  Austria ................................ 426/205

Primary Examiner—Francis S. Husar
Assistant Examiner—William R. Briggs
Attorney, Agent, or Firm—Charles N. Quinn

[57] ABSTRACT

Apparatus for forming rigid structures such as disk brake pads from a dry mix of friction material includes a compression molding press, a friction material agitator and an improved mechanism for transporting friction material from the agitator to the press with friction material preform forming apparatus between the agitator and the press defining an intermediate portion of the improved transport mechanism.

6 Claims, 6 Drawing Figures

APPARATUS FOR MOLDING RIGID STRUCTURES FROM DRY FRICTION MATERIAL

This patent application, the parent application hereto which is United States patent application Ser. No. 637,914 which has issued as United States Pat. No. 4,003,498, and the parent application thereto, pending United States patent application Ser. No. 633,054, were all submitted by Edward Moneghan and assigned to Pennwalt Corporation. United States patent application serial number 633,054 discloses and claims subject matter which is disclosed and claimed in pending United States patent application Ser. No. 580,470, filed May 22, 1975 and now abandoned by Frank Shelton and assigned by him to Maremont Corporation.

BACKGROUND OF THE INVENTION

1. Field of the Invention

This invention relates to apparatus for forming dry, high bulk, friction materials into rigid structures which are substantially immediately useable without further modification in applications requiring friction resistant structures.

2. SUMMARY OF THE INVENTION

Heretofore, it has not been known to provide apparatus for compression molding rigid friction material structures of the type set forth, including apparatus for progressively withdrawing mixed friction material from a remotely located supply and feeding it to a plasticizing screw along a closed path. Also unique is an agitator, suitable for progressive withdrawal of mixed friction material therefrom while agitating at least a portion of the remaining material. Further provided is apparatus, preferably a closed flexible auger, for progressively transporting the withdrawn friction material along a closed path to the plasticizing screw.

DESCRIPTION OF THE PREFERRED EMBODIMENTS

Figure 1:
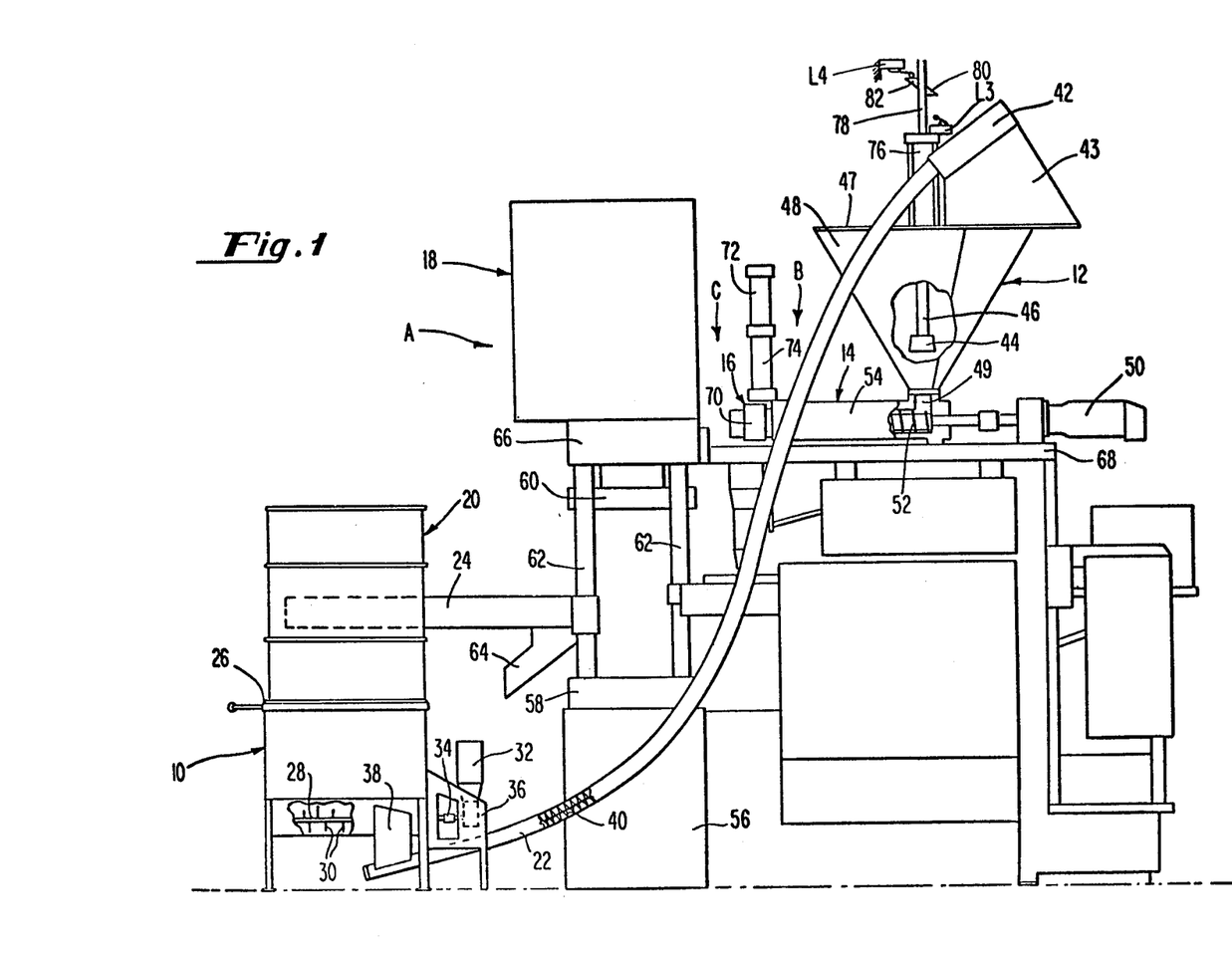
FIG. 1 is a side elevation view of the preferred embodiment of apparatus of the present invention.

Reference is made to FIG. 1 wherein there is shown the apparatus for compression molding rigid bodies from friction material. Container 20 containing the friction material recipe is mounted atop agitator 10 for release thereinto of friction material. Agitator 10 is connected to hopper 48 of a stuffer 12 by feed means 22 through which the agitated mix of friction material recipe is transferred to stuffer hopper 48. Stuffer hopper 48 is mounted atop extruder 14 for delivery of mixed friction material recipe thereinto. Extruder 14 has preforming means 16 proximate one end thereof for receipt of partially plasticized friction material. Compression molding press 18 molds friction material preforms into the final molded product.

Container 20 is mounted on agitator 10 for closed transfer of friction material recipe into agitator 10, without release of any dust or particulate matter into the atmosphere. Sealing means 26 at the juncture of container 20 and agitator 10 assures that no dust or fine particulate friction material escapes during transfer of the mixture from container 20 to agitator 10. A suitable cover (not shown) may be used in place of sealing means 26 to close the open top of the agitator after the container is empty.

Agitator 10 has therewithin a horizontal shaft 28 which has a plurality of fingers 30 extending radially therefrom. Horizontal shaft 28 is driven by motor 32, which is preferably an electric motor, through gear reduction means enclosed within housing 36. In FIG. 1, agitator 10 has been broken away to show horizontal shaft 28 and attached fingers 30. Agitator 10 has extending downwardly therefrom a duct 38 for guiding the mixed and agitated friction material recipe into a flexible feeder 22. Flexible feeder 22 has therein a flexible, continuous screw 40 of the auger type.

Flexible screw 40 is driven by hydraulic motor 42 mounted at an end of flexible screw 40 remote agitator 10. Hydraulic motor 42 could equally well be mounted at the end of flexible screw 40 proximate agitator 10. Hydraulic motor 42 is mounted on a mounting bracket 43 affixed to stuffer hopper 48. Bracket 43, in addition to supporting hydraulic motor 42, encloses the end of flexible screw 40 from which transported friction material drops into stuffer hopper 48. A cover 47 covers the top of stuffer hopper 48 so no friction material can escape as it drops into stuffer hopper 48.

Stuffer hopper 48 has been partially broken away in FIG. 1 to show a plunger 44 secured to the lower end of an upright, vertical shaft 46. Plunger 44 and shaft 46 reciprocate vertically, to stuff friction material in tapered stuffer hopper 48 through an orifice 49 into contact with rotatable plasticizing screw 52. Plunger 44 and shaft 46 are driven by an air cylinder 76 above stuffer hopper 48.

The plasticizing apparatus, designated generally by arrow B, includes plasticizing screw 52 mounted for rotational motion within plasticizing screw housing 54. Plasticizing screw 52 is driven by a hydraulic motor 50. Screw 52, housing 54 and motor 50 are parts of extruder 14. Extruder 14 is mounted on a bed plate 68.

At least one preform cup 70 is at the end of plasticizing screw 52 for receipt of at least partially plasticized material exiting screw housing 54. An air cylinder 72 is above the juncture of cup 70 and housing 54. A housing 74 encloses a guillotine knife (not shown) which may be driven downwardly by air cylinder 72, between the preform cup and the plasticizing screw housing. This assembly is referred to as the preforming section.

Molding press 18 has a base 56 upon which stationary platen 58 is mounted. Above stationary platen 58, on connecting guide posts 62, is a moveable platen 60. Mold halves, not shown, are disposed on the two platens. Rigid friction material bodies are formed in mold cavities defined by the mold halves when preforms of friction material are placed into the respective mold cavities, the mold halves are brought together, and heat and pressure are applied. Duct 64 is provided, adjustably affixed to one of guide posts 62, for transferring molded rigid friction material bodies away from the press once molding is complete. A hydraulic cylinder contained in enclosure 66 provides vertical movement of moveable platen 60.

Extending upwardly from a reciprocable piston in air cylinder 76 is rod 78 which has selectably positionable upper and lower cam means 82 and 80 affixed thereto. Upper cam means 82 actuates an upper limit switch L4, while lower cam means 80 actuates a lower limit switch L3. Upper and lower limit switches L4 and L3 are actuated by their respective associated cam means during reciprocation of rod 78.

Figure 2:
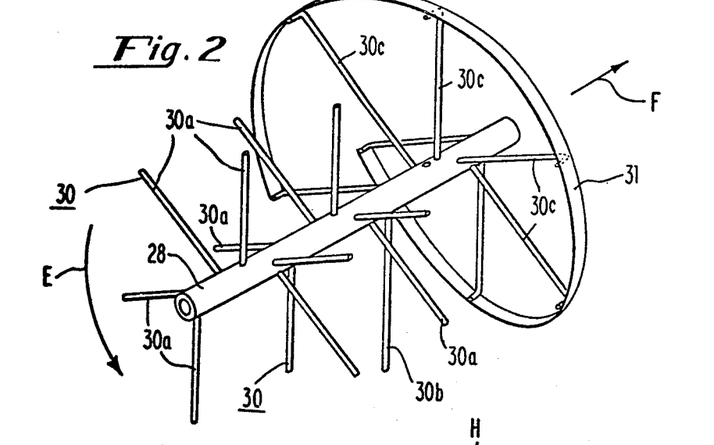
FIG. 2 is an enlarged isometric view of a rotatable horizontal shaft removed from the agitator portion of the apparatus of FIG. 1.
Figure 3:
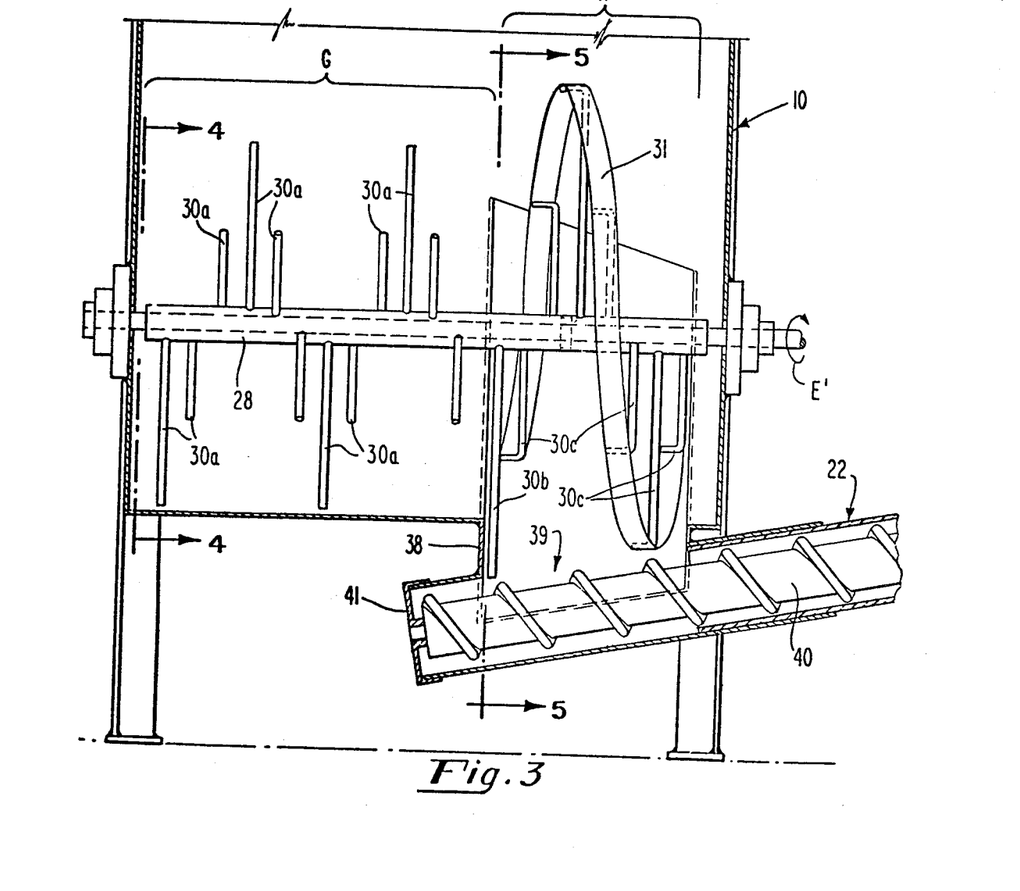
FIG. 3 is an enlarged, vertical side sectional view of the agitator portion of the apparatus of FIG. 1, with internal parts shown in elevation.

Reference is now made to FIGS. 2 and 3 wherein horizontal shaft 28 of agitator 10 is shown with a plurality of fingers 30, individually denoted 30a, 30b and 30c, protruding therefrom in a radial direction, with ribbon 31 helically formed about and affixed to the extremities of fingers 30c. Horizontal shaft 28 rotates in the direction shown by arrow E. Radially extending fingers 30a and 30b continuously agitate the friction material. Radially extending fingers 30c are each of different length and arranged extending from horizontal shaft 28 in order of decreasing length in the axial direction denoted by arrow F. Due to the helical shape of ribbon 31, as horizontal shaft 28 is rotated through friction material in agitator 10, friction material in the neighborhood H of helical ribbon 31 is urged in direction F. Friction material remote from the helical ribbon, proximate fingers 30a, then moves in direction F, to fill the void created when material more proximate ribbon 31 has dropped through duct 38 for removal by flexible screw 40.

Feeder 22 is provided with end sealing means 41 to close the lower end of flexible feeder 22 so no dust or friction material can escape. In the area of agitator 10 denoted by bracket G, equal length fingers 30a agitate the friction material and maintain it in a light, homogeneous condition. In the area denoted by bracket H, extended finger 30b, in combination with fingers 30c, serves to draw friction material from area G into area H.

Figure 4:
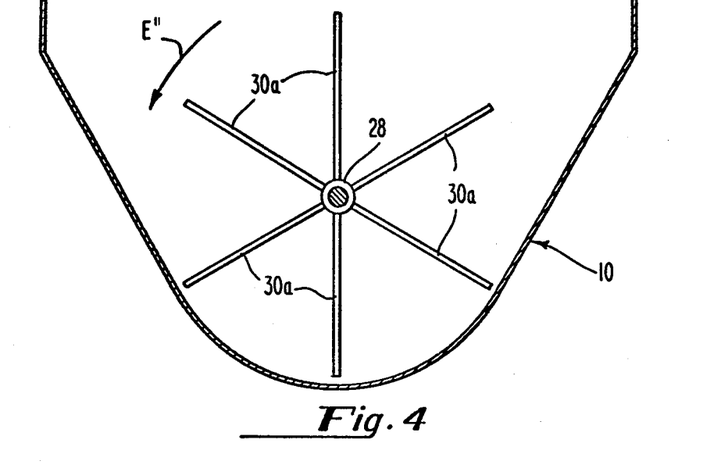
FIG. 4 is a vertical sectional view of the agitator portion of the apparatus of FIG. 1, taken along line 4—4 in FIG. 3.

Reference is now made to FIG. 4 wherein there is shown an end view of horizontal shaft 28 with six equal length fingers 30a extending radially therefrom. Fingers 30a are closely spaced to the wall of agitator 10 to maintain substantially all the friction material within agitator 10 in an agitated, fluffed, homogeneous state. The direction of rotation of horizontal shaft 28 is denoted by arrow E″.

Figure 5:
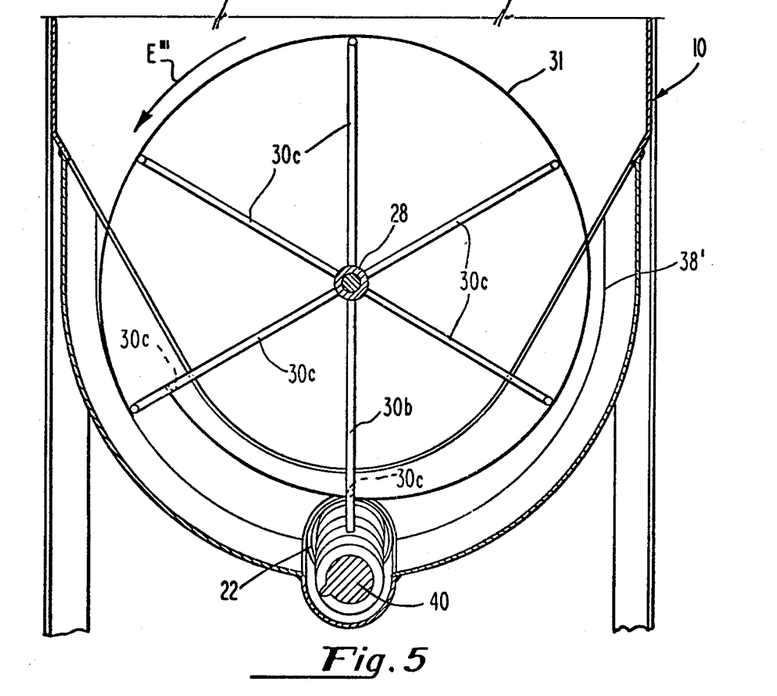
FIG. 5 is another vertical sectional view of the agitator portion of the apparatus of FIG. 1, taken along line 5—5 in FIG. 3.

In FIG. 5, the direction of rotation of horizontal shaft 28 is shown by arrow E‴. The projection of duct 38 is denoted 38′. As shaft 28 rotates, corkscrew-type motion of helical ribbon 31 results in friction material in agitator 10 gathering in the neighborhood of helical ribbon 31. Due to this action and the force of gravity, friction material falls downward into proximity with flexible screw 40 which removes the friction material from agitator 10 along a closed path.

Figure 6:
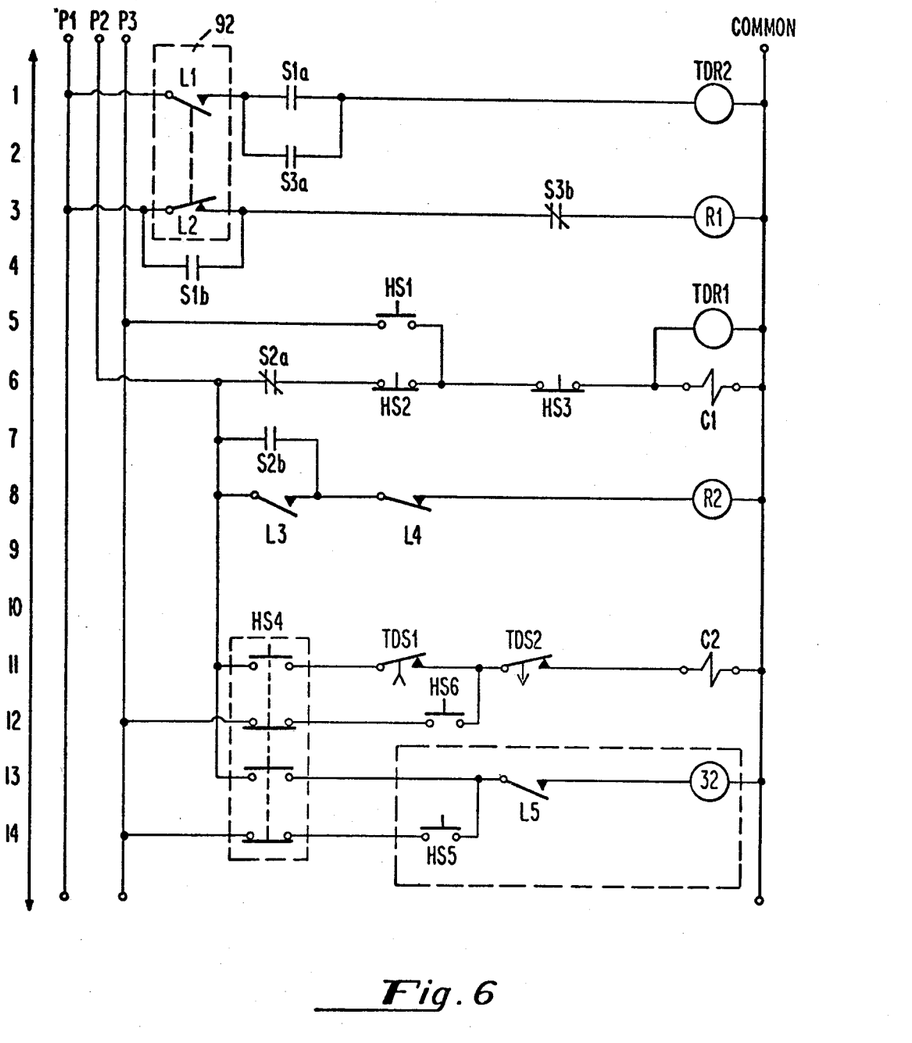
FIG. 6 is a schematic diagram of an electrical circuit of the present invention.

FIG. 6 is a diagram of electrical circuitry which controls feed of friction material from agitator 10 into stuffer hopper 48. P1 and COMMON are main electrical power lines. Switch L5 controls motor 32 and provides an electrical interlock whereby when agitator 10 is open, no mixing of friction material can take place. Line P2 provides power to the circuit elements when the apparatus is feeding friction material in an automatic mode, described below. Line P2 is in parallel with electrical circuitry controlling hydraulic drive motor 50 so automatic feeding of friction material cannot occur unless plasticizing screw 52 is rotating. Line P3 provides power to feed friction material in a manual operating mode. Power to Line P3 is controlled by a manual switch not shown in the diagram.

Element 92 is a material level sensing means in stuffer hopper 48. Upper and lower limit switches L1 and L2 are mechanically tied and are actuated by the presence of friction material in stuffer hopper 48. S1a is a pair of normally open contact points actuated by relay R1 while S3a is a pair of normally open contact points actuated by a time delay relay TDR2; S1a and S3a provide a holding circuit for TDR2. TDR2 is an "off time delay relay;" when TDR2 is energized, it immediately opens normally closed switch TDS2. The timer portion of TDR2 begins to time only when TDR2 is deenergized. Once the timer portion of TDR2 has timed out, TDS2 closes. The timing function of TDR2 does not affect conventional relay contact points S3a or S3b, both actuated by TDR2. Contact points S3a are normally open and close when TDR2 is energized while contact points S3b are normally closed and open when TDR2 is energized. The timing function of TDR2 is adjustable so the time TDS2 remains open, after TDR2 has been deenergized, can be varied.

S1b is a pair of normally open contact points actuated by relay R1; S1b provides a holding circuit for R1. HS1, HS2 and HS3 are hand-actuated switches which are respectively normally open, normally closed and normally closed. These three switches allow hand control of TDR1 and C1. TDR1 is an "on time delay relay" with timing starting when TDR1 is energized. TDR1 opens normally closed pair of contact points TDS1 when it has timed out. Once de-energized, TDR1 allows points TDS1 to return to their normally closed position. Coil C1 controls air cylinder 76. When C1 is energized, air is supplied to cylinder 76 causing a downward stroke of reciprocating plunger 44 and vertical rod 78. When C1 is de-energized, reciprocating plunger 44 and vertical rod 78 are returned to their starting position, where the downward stroke begins.

S2a and S2b respectively are normally closed and normally open pairs of contact points actuated by relay R2. L3 and L4 are the lower and upper limit switches actuated by lower and upper adjustable cam means 80 and 82 respectively. L3 is normally open and is closed only during contact with adjustable cam means 80; this contact defines the maximum downward travel of plunger 44. L4 is normally closed and is opened by adjustable cam means 82 at the maximum upward travel of plunger 44.

HS4 is a hand switch with four sets of contact points, two of which are normally open and two of which are normally closed. Hand actuation of HS4 changes operation from manual to the automatic mode. HS6 is a hand switch for manual operation of hydraulic motor 42 which powers flexible screw 40. Coil C2 when energized actuates a conventional hydraulic valve which controls the flow of hydraulic fluid to hydraulic motor 42. HS5 is a normally open hand actuated switch.

Operation of the Invention

Friction material is fed at a controlled rate along a closed path to plasticizing screw 52 in FIG. 1. The closed path insures that the friction material will not escape to surrounding ambient air. Any such release of friction material would make the area unsuitable for workers.

Feeding is initially accomplished by feeding material in agitator 10 into flexible screw 40 through duct 38. As horizontal shaft 28 rotates, it tends to keep the material agitated thereby preventing material from bridging above the pick-up area of flexible screw 40. Agitation also forces material in the agitator hopper from left to right in FIG. 1, into duct area 38.

Flexible screw 40 is rotationally driven by hydraulic motor 42 and feeds friction material from duct 38 through flexible feeder 22 along a spiral path into stuffer hopper 48.

Once friction material has been discharged into stuffer hopper 48, the material is then force-fed through orifice 49 into contact with plasticizing screw 52 by reciprocating plunger 44 with air cylinder 76.

Horizontal shaft 28 and fingers 30 in agitator 10, flexible screw 40, stuffer hopper 48 and reciprocating plunger 44 function to feed friction material to plasticizing screw 52, through a closed system, at a rate suitable for operation of plasticizing screw 52. Accordingly, operation of horizontal shaft 28, flexible screw 40 and reciprocating plunger 44 must be coordinated to properly feed plasticizing screw 52. For plasticizing screw 52 to properly function, it must receive friction material at the rate at which screw 52 can carry friction material away from orifice 49 through screw housing 54 for deposit into preform cup 70. Since friction materials are not free-flowing, these materials may "bridge" across orifice 49 thereby preventing plasticizing or extruding screw 52 from receiving any material. One function of reciprocating plunger 44 is to break any material bridging which occurs above orifice 49 and to stuff material down orifice 49 into contact with plasticizing screw 52. In this way, there is assurance that plasticizing screw 52 is receiving friction material at least as fast as plasticizing screw 52 can remove material from orifice 49.

For reciprocating plunger 44 to properly function, the rate at which friction material is fed into stuffer hopper 48 must be precisely controlled. This feed rate must equal the rate at which plasticizing screw 52 removes friction material from orifice 49. If the amount of material fed into stuffer hopper 48 is too small, too little material will move through plasticizing screw barrel 54, causing material in barrel 54 to become too hot. This is unacceptable since the temperature of material reaching preform cup 70 must be controlled to a close tolerance. If the temperature is too high, too much cure of the thermoset resin portion of the material will occur, making molding impossible. If too much material is fed into stuffer hopper 48, material will build up therein because plasticizing screw 52 will be unable to remove it quickly enough from orifice 49. This also is unacceptable because of the characteristic of friction material whereby the material will not flow vertically when such build-up begins. When too much material is fed in, reciprocating plunger 44 only makes a hole through the built-up material and built-up walls of material do not collapse, an effect called "rat-holing". Any material in plasticizing screw barrel 54 overheats because insufficient material is present therein to dissipate the heat generated with the barrel.

For controlling rate of feed of friction material to the plasticizing screw, three controls are provided. A first control is a valve controlling rate of flow in the hydraulic fluid line connected to hydraulic motor 42. This flow control is conventional, is preferably hand operated and is not shown in the drawings. It is preset for a given type of material which is fed into stuffer hopper 48. Normally once a proper setting is determined for this flow control it need not be further adjusted. This flow control adjusts the speed of hydraulic motor 42 thereby adjusting the speed at which flexible screw 40 rotates. The speed at which flexible screw 40 rotates controls the rate of feed of friction material into stuffer hopper 48. Unfortunately, due to the nature of friction materials, with their inconsistent, nonhomogenous make-up, a constant rate of feed of friction material into stuffer hopper 48 will not permit the degree of control of the amount of friction material in hopper 48 which is required for successful operation of reciprocating plunger 44. Accordingly, a second control is needed.

The second control is a time control consisting of first time delay relay TDR1 controlling coil C2 which activates a conventional input electrical circuit, not shown, which serves to actuate a conventional hydraulic valve, not shown, which controls fluid flow to hydraulic motor 42. First time delay relay TDR1 actuates when reciprocating plunger 44 starts its downward stroke. Time delay relay TDR1 has associated therewith a preset time upon elapse of which, after actuation of TDR1, TDR1 is said to "time-out". When TDR1 times out, it opens TDS1 in the input circuit to coil C2 thereby closing the hydraulic valve, denying hydraulic fluid to hydraulic motor 42 thereby stopping rotation of flexible screw 40 and haulting feed of friction material into stuffer hopper 48. TDR1 can be set to a suitable time whereupon it will stop any over-feed of friction material.

A third control used for control of the feed rate of friction material through orifice 49 to plasticizing screw 52 is level sensing means 92 which senses the level of friction material in stuffer hopper 48. Level sensing means 92 is connected to electrical circuitry for control of hydraulic fluid to hydraulic motor 42. So long as the level of material is maintained below a critical high level is stuffer hopper 48, reciprocating plunger 44 will successfully stuff material through orifice 49 into proximity with plasticizing screw 52.

Electrical power controlling feed of air to cylinder 76, feed of electricity to motor 32 and feed of hydraulic fluid to hydraulic motor 42 is in parallel with electrical power controlling operation of screw motor 50. Thus, only when plasticizing screw 50 is operative and rotating will friction material be fed from agitator hopper 10 through flexible feeder 22 into stuffer hopper 48 through orifice 49 and into proximity with plasticizing screw 52.

Level sensing means 92 in stuffer hopper 48 is a safety device which functions only upon failure of TDR1. During normal operation TDR1 serves exclusively to control operation of air cylinder 76, reciprocating plunger 44 and vertical shaft 46.

During normal automatic operation sequencing of TDR1 is as follows: Initially, assume plasticizing screw 52 is rotating thereby feeding partially plasticized material into preform cup 70. Air cylinder 76 is actuated thereby initiating downward travel of reciprocating plunger 44 and rod 78. Upper adjustable cam means 80, slidably affixed to rod 78, moves downward unitarily with rod 78 thereby allowing limit switch L4 to trigger TDR1 by deenergizing R2 thereby allowing S2a to return to the normally closed state. This actuates the timer associated with TDR1. When reciprocating plunger 44 reaches the lower extremity of its travel, lower cam means 82 contacts limit switch L3 which energizes R2 thereby opening S2a and deenergizing C1 and TDR1. This reverses air flow into cylinder 76 causing reciprocating plunger 44 to rise to its upper extremity where another reciprocation of plunger 44 is begun. Note that if TDR1 times out, reciprocating plunger 44 continues its downward travel; it does not stop upon completion of the preset time. TDR1 is to control operation of hydraulic motor 42, which drives flexible screw 40, not to control operation of reciprocating plunger 44. Either of two events makes the piston in cylinder 76 travel to its upper extremity whereupon it is ready to begin another downward stroke; these two events are (1) stopping plasticizing screw 52, which means preform cup 70 is full or (2) allowing reciprocating plunger 44 to reach a lower extremity of travel whereupon lower adjustable cam means 82 actuates bottom limit switch L3. If TDR1 times out during a downward portion of a reciprocation of plunger 44, this signifies that friction or high bulk material is well packed below plunger 44, in orifice 49 and in good contact with plasticizing screw 52. If reciprocating plunger 44 is contacting friction material in stuffer hopper 48 when TDR1 times out, reciprocating plunger 44 does not stall because plasticizing screw 52 continues to rotate thereby continuously removing material from orifice 49; accordingly reciprocating plunger 44 continues to travel downwardly. If plasticizing screw 52 stops rotating due to shutoff of electrical power, consequent deenergizing of coil C1 causes reciprocating plunger 44 to return to its extreme top position to begin another downward portion of a reciprocation upon reconnection of electrical power to plasticizing screw 52.

When the feeding mechanism is operated manually, power is supplied through line P3. Actuation of HS1 energizes C1, thereby causing reciprocation of the piston in air cylinder 76 with consequent reciprocation of plunger 44 and actuation of TDR1. However actuation of TDR1 need have no effect on the feeding mechanism since TDS1 may be effectively bypassed by actuation of HS6. Assuming TDS2 is in its normally closed position, actuation of HS6 actuates C2 which initiates operation of hydraulic motor 42, providing friction material to stuffer hopper 48. Similarly, manual actuation of HS5 energizes electric motor 32 thereby rotating horizontal shaft 28 (assuming L5 is closed, indicating the cover interlock on agitator 10 is operative).

When operating in the manual mode, level sensing means 92 and TDR2 are both operative from power supplied through line P1. This means that even in the manual operating mode, if stuffer hopper 48 becomes too full of material, TDR2 will be actuated, opening TDS2, stopping hydraulic motor 42 and halting feed of friction material into stuffer hopper 48. Level sensing means 92 and TDR2 operate in the same fashion when the feeding mechanism is in automatic mode since power is always supplied through line P1, no matter which mode of operation is used.

Reference is again made to FIG. 6 for consideration of operation in the automatic feed mode. HS4 is a selector switch which the operator uses to select automatic or manual operation. In FIG. 6, HS4 is in position for manual operation. While operating in the automatic mode, HS4 is actuated, from the state shown in FIG. 6, thereby making circuits in reference lines 11 and 13 and breaking circuits in reference lines 12 and 14. Referring to reference lines 1, 2, 3, and 4, so long as the level of friction material in stuffer hopper 48 is below that at which L1 is closed, L2 remains closed, energizing R1 which causes S1a and S1b to be actuated from their normally open positions to closed positions. Upon material in stuffer hopper 48 reaching the maximum allowable level, L1 closes, thereby opening L2. R1 remains energized due to closed S1b. Once L1 closes, TDR2 is energized since S1a is closed. Upon TDR2 being energized, S3a closes, S3b opens and TDS2 opens thereby halting feed of friction material by deenergizing coil C2 which controls hydraulic motor 42. TDS2 remains open, preventing feed of friction material, until TDR2 has been deenergized. TDR2 is deenergized when the level of material in stuffer hopper 48 drops and deactuates L2, and the timer portion of TDR2 times out. S3a and S3b respectively close and open immediately upon TDR2 energizing, since S3a and S3b are not connected to the timing function of TDR2. Once the level of friction material in stuffer hopper 48 has dropped below the maximum allowable level, L1 opens and L2 closes, energizing R1. This closes S1b, providing a hold circuit for R1. Upon L1 opening, TDR2 is no longer energized and S3b returns to its normally closed position. TDS2 returns to its normally closed state after the timing function of TDR2 has finished.

TDR1 begins to time when it is energized with C1 which actuates a valve in an air line to cylinder 76. When C1 is energized, the piston in cylinder 76 begins its downward stroke, causing plunger 44 and rod 78 to begin the downward portion of a reciprocation. TDR1 begins to time when plunger 44 starts down. S2a is normally closed and is actuated by R2. When C1 is actuated and the piston in cylinder 76 begins downward travel, R2 is not energized and S2a is in its normally closed position. L4 is in its normally closed position, having closed immediately upon upper adjustable cam means 82 moving away from L4 upon downward movement of rod 78. Once the piston in cylinder 76 starts downward, it continues downward until lower adjustable cam means 80 closes normally open L3. This energizes R2 thereby opening S2a and closing S2b. Closure of S2b provides a holding circuit which maintains R2 in the energized state. When S2a opens, C1 is de-energized thereby causing the piston in cylinder 76 to travel upwardly from its extreme downward position. TDR1 is also de-energized. The piston in cylinder 76 continues up until upper adjustable cam means 82 opens normally closed L4. This de-energizes R2, allowing S2a and S2b to return to their normally closed and normally open states respectively. When S2a closes, C1 is energized and the piston begins another downward stroke. Thus, once drive motor 50 for plasticizing screw 52 is actuated and HS4 is in position for automatic operation, the piston in cylinder 76 begins to reciprocate.

Clearly, each time the piston in cylinder 76 reciprocates upon actuation of C1, TDR1 is also energized and begins to time. When TDR1 times out, normally closed TDS1 opens thereby deenergizing C2. This stops hydraulic motor 42, halting feed of friction material into stuffer hopper 48. TDS1 closes when TDR1 is energized again at the start of another downward stroke of the plunger. TDS2 opens upon TDR2 being energized, remains open as TDR2 times after being deenergized and closes only when TDR2 times out. As noted above, TDR2 is only actuated when level sensor 92 senses that friction material has accumulated to the maximum allowable level in stuffer hopper 48. Thus, TDR1 and TDR2 together actuate C2 and control hydraulic motor 42.

This operation is as follows: TDR1 is energized and begins to time each time plunger 44 initiates a downward stroke. If a reciprocation of plunger 44 is completed before TDR1 times out, TDR1 initiates timing again upon the start of the next downward stroke of plunger 44. Energizing TDR1 on a second downward stroke of plunger 44 before TDR1 has timed out from the previous stroke of plunger 44 causes TDS1 to remain closed. In this condition C2 remains energized and hydraulic motor 42 continues to operate screw 40, continuing feed of friction material into stuffer hopper 48. Once stuffer hopper 48 becomes sufficiently full of material that a downward stroke of plunger 44 is impeded to the extent that a full reciprocation of plunger 44 exceeds the time to which timer portion of TDR1 has been set, TDS1 opens, halting feed of material into stuffer hopper 48. In such case, TDS1 remains open until TDR1 is again energized when plunger 44 has completed its downward stroke and has returned to its extreme upward position. Thus, when so much material has been fed into stuffer hopper 48 that plunger 44 requires an extended time to complete a single reciprocation, feed of material into stuffer hopper 48 is halted until plunger 44 has begun another downward reciprocation.

If material in stuffer hopper 48 exceeds the maximum allowable level, thereby closing normally open L1 and energizing TDR2, TDS2 immediately opens, de-energizing C2, stopping hydraulic motor 42 and halting feed of friction material into stuffer hopper 48. TDS2 remains open so long was TDR2 is energized and after TDR2 is deenergized until TDR2 times out. Only after TDR2 times out does TDS2 close, thereby energizing C2, operating hydraulic motor 42 and feeding more friction material into stuffer hopper 48. TDR2 does not start to time until it is deenergized by L1 opening due to drop of the level of friction material in stuffer hopper 48. The time interval to which TDR2 is normally set is sufficiently long to allow plunger 44 to perform at least a major portion of one reciprocation. Thus TDS2 once open does not close until the level of friction material in stuffer hopper 48 has dropped below the maximum allowable high level and plunger 44 has forced some friction material through orifice 49 into contact with plasticizing screw 52. In this way TDR1 and TDR2, by actuating TDS1 and TDS2 respectively, prevent the level of friction material in stuffer hopper 48 from exceeding the maximum allowable level at which rat-holing starts to occur and allow plunger 44 to stuff some material through orifice 49 before stuffer hopper 48 is again completely refilled. This is the process of "starve feeding" without which plunger 44 cannot successfully feed friction material through orifice 49 into contact with plasticizing screw 52.

Electric motor 32 driving horizontal rotating shaft 28 runs continuously when the feeding apparatus is operating in the automatic mode, so long as normally open L5 is closed by a cover or sealing means 26 at the top of agitator 10. Thus, material in agitator 10 is continuously mixed without regard to whether any material is being removed from agitator 10 by flexible screw 40.

The molded rigid friction material bodes are ejected from molding press 18 by suitable means at the termination of each cycle of the molding press. The friction material bodies fall through duct 64 for movement to curing ovens.

The preferred embodiments for the apparatus have been described for the purpose of illustrating the function and structure of the present invention. However, the present invention is not to be deemed limited to the embodiments described herein. This invention includes all embodiments and modifications which are encompassed within the scope of the claims appended hereto.

I claim:

1. Apparatus for forming rigid structures such as disk brake pads from a dry mix of light and fluffy friction material, comprising in combination:
    (a) a compression molding press having an openable mold with at least one mold cavity therein;
    (b) a plasticizing screw, enclosed in a heated housing mounted on said press, for at least partially plasticizing a charge of dry friction material by extruding said charge at an elevated temperature through a nozzle at one end of said housing;
    (c) a cup having an open end facing said nozzle, said cup being adjacent to said nozzle, for receiving the preheated extrusion from the nozzle as the charge of plasticized friction material is extruded through said nozzle and into said cup, said cup having a curved wall acting to shape the extrusion into a compact preformed mass as the extrusion enters the cup from the nozzle;
    (d) a transfer chute, having inlet and outlet ends, for transferring the compact preformed mass from the cup into said mold cavity prior to closure of the mold, said chute inlet end communicating with said cup and said chute outlet end communicating with said mold cavity;
    (e) a mixing hopper of air-tight construction, for storing and agitating said dry mix of friction material, at a position remote from said plasticizing screw;
    (f) a stuffer hopper of closed construction disposed above said plasticizing screw housing, having a bottom outlet connected via a conduit to an inlet of said plasticizing screw housing, for temporary storage of a portion of said dry mix of friction material as said dry mix of friction material is fed thereinto intermediate to being fed into said plasticizing screw housing, said stuffer hopper including a reciprocable plunger, within said hopper, for displacing said dry mix of friction material from within said stuffer hopper downward through said bottom outlet and into said plasticizing screw housing on a plunger downstroke;
    (g) a mechanical conveyor of closed construction from which substantially no friction material can escape to ambient air, operatively associated with said mixing hopper and said stuffer hopper to transport said dry mix of friction material along a closed path from said mixing hopper to said stuffer hopper; and
    (h) first control means operably associated with said mechanical conveyor, for governing transport of material to said stuffer hopper by said mechanical conveyor whenever time for a downward portion of a reciprocation of said reciprocable plunger exceeds a first predetermined time.

2. The improved combination of claim 1 further comprising second control means, coupled to said hopper and said enclosed mechanical conveyor means, operative when said plasticizing screw means rotates, responsive to a level of said friction material in said hopper being above a predetermined level, for interrupting operation of said enclosed mechanical conveyor transporting means.

3. The improved combination of claim 2 wherein said first control means is operative when said material level in said closed elevated stuffer hopper is below said predetermined level and interrupts transport of material to said closed elevated stuffer hopper by stopping said enclosed conveyor transport means.

4. In compression molding system apparatus for forming rigid structures such as disk brake pads from a dry mix of light and fluffy friction material, including:
   (a) a compression molding press having an openable mold with at least one mold cavity therein;
   (b) heated rotatable plasticizing screw means for at least partially plasticizing a charge of dry friction material by extruding the charge at an elevated temperature through a nozzle;
   (c) a cup having an open end facing said nozzle, said cup being adjacent to said nozzle, for receiving the preheated extrusion from the nozzle as said charge is extruded through said nozzle and into said cup, said cup having a curved wall acting to shape the extrusion into a compact preformed mass as the extrusion enters the cup from the nozzle;
   (d) a transfer chute, having inlet and output ends for transferring the compact preformed mass from the cup into said mold cavity prior to closure of the mold, said chute inlet end communicating with said cup and said chute outlet end communicating with said mold cavity;
   (e) air-tight mixing hopper means, for storing and agitating said dry mix of friction material, from which substantially no material can escape to ambient air;
   (f) closed elevated stuffer hopper means, having a bottom outlet connected via an enclosed orifice to an inlet to said plasticizing screw means, for temporary storage of said dry mix of friction material as said dry mix of friction material is fed thereinto intermediate to being fed to said plasticizing screw means from which substantially no material can escape to ambient air, including reciprocable plunger means interior said closed elevated hopper for contacting and downwardly displacing said dry mix of friction material from said stuffer hopper through said orifice and into proximity with said plasticizing screw means on a plunger downstroke; and
   (g) enclosed mechanical conveyor means operatively associated with said mixing hopper and said stuffer hopper for transporting said dry mix of friction material along a closed path from said air-tight mixing hopper to said closed elevated stuffer hopper, from which substantially no friction material can escape to ambient air; that improvement comprising:
   (h) control means, operative while said plasticizing screw rotates, for governing transport of material to said closed stuffer hopper by said enclosed mechanical conveyor, comprising:
      (i) means, responsive to material in said stuffer hopper reaching a preselected maximum level, regulating said enclosed mechanical conveyor when material in said stuffer hopper reaches said preselected maximum level; and
      (ii) means, operative when material in said stuffer hopper is below said preselected maximum level, comparing downward travel time of said plunger during a reciprocation thereof to a first preselected time and regulating said conveyor when said downward travel time exceeds said first preselected time.

5. The compression molding system apparatus with improved control means of claim 8 wherein said means of element (ii) is operative only when material in said stuffer hopper has been below said preselected maximum level for a second preselected time.

6. The compression molding system apparatus with improved control means of claim 5 wherein said second time is preselected by adjustment of a timer portion of said means of element (i) and wherein said first time is preselected by adjustment of a timer portion of said means of element (ii).

* * * * *